United States Patent
Okada et al.

(10) Patent No.: US 8,863,305 B2
(45) Date of Patent: Oct. 14, 2014

(54) FILE-ACCESS CONTROL APPARATUS AND PROGRAM

(75) Inventors: Koji Okada, Tokyo (JP); Tatsuro Ikeda, Fuchu (JP); Masataka Yamada, Fuchu (JP); Minoru Nishizawa, Fuchu (JP); Takanori Nakamizo, Chofu (JP); Toshio Okamoto, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 489 days.

(21) Appl. No.: 12/552,927

(22) Filed: Sep. 2, 2009

(65) Prior Publication Data

US 2010/0043070 A1 Feb. 18, 2010

Related U.S. Application Data

(63) Continuation of application No. PCT/JP2008/069671, filed on Oct. 29, 2008.

(30) Foreign Application Priority Data

Oct. 29, 2007 (JP) ................................. 2007-280800

(51) Int. Cl.
*H04L 29/06* (2006.01)
*G06F 21/31* (2013.01)
*G06F 21/62* (2013.01)

(52) U.S. Cl.
CPC ............ *G06F 21/6209* (2013.01); *G06F 21/31* (2013.01); *H04L 2463/101* (2013.01)
USPC .............................................. 726/27; 726/21

(58) Field of Classification Search
CPC ........................... G06F 21/31; H04L 2463/101
USPC ................................................... 726/1, 21, 27
See application file for complete search history.

(56) References Cited

U.S. PATENT DOCUMENTS

| | | | |
|---|---|---|---|
| 6,253,193 B1 * | 6/2001 | Ginter et al. | 705/57 |
| 7,882,537 B2 * | 2/2011 | Okajo et al. | 726/1 |
| 2006/0178975 A1 * | 8/2006 | Jung et al. | 705/35 |

FOREIGN PATENT DOCUMENTS

| | | |
|---|---|---|
| JP | 2005-56418 | 3/2005 |
| JP | 2005-301510 A | 10/2005 |

(Continued)

OTHER PUBLICATIONS

Tim Moses, "eXtensible Access Control Markup Language (XACML) Version 2.0", Oasis Standard, URL http://docs.oasis-open.org/xacml/2.0/xacml-2.0-os-normative.zip, Feb. 1, 2005, 141 pages.

(Continued)

*Primary Examiner* — Hadi Armouche
*Assistant Examiner* — Dao Ho
(74) *Attorney, Agent, or Firm* — Oblon, Spivak, McClelland, Maier & Neustadt, L.L.P.

(57) ABSTRACT

In a file-access control system according to an embodiment of this invention, control data in accordance with actions made is imparted, as an obligation-type policy, to a document file. Next, a policy evaluation control unit evaluates and executes the obligation-type policy imparted to the document file in accordance with the action to the document file. The execution of the obligation-type policy includes the controlling of a document application on the basis of an obligation fulfillment action. Therefore, an active control can be performed in accordance with any manipulation made to the document, and the access to the document can be changed.

10 Claims, 10 Drawing Sheets

(56) References Cited

FOREIGN PATENT DOCUMENTS

| | | |
|---|---|---|
| JP | 2007-048241 A | 2/2007 |
| JP | 2007-213208 A | 8/2007 |
| JP | 2007-257352 A | 10/2007 |

OTHER PUBLICATIONS

International Preliminary Report on Patentability and Written Opinion mailed on Jun. 10, 2010 in corresponding PCT/JP2008/069671 filed on Oct. 29, 2008 (previously submitted on Aug. 16, 2010).

Ken'ichi Oto Kenichi Ooto, "Koshu Musen LAN no On-demand Riyo no Tameno Riyoken Kijutsuho A description method of use-right for on-demand wireless LAN usage", IEICE Technical Report, vol. 105, No. 357, IEICE Technical Report, Oct. 13, 2005, vol. 105, pp. 9 to 12.

Sumitaka Okajo Sumitaka Okajo, "Security Un'yo Kanri no Tameno Policy Gengo SCCML A Policy Description Language for Policy-based Security Management", IPSJ SIG Notes, vol. 2004, No. 129, IPSJ SIG Technical Reports, Dec. 20, 2004, vol. 2004, pp. 89 to 94.

* cited by examiner

```
<Policy PolicyId="policyId0001">
  <Rule RuleId="ruleId0001" Effect="Permit">
    <Condition FunctionId=
"urn:oasis:names:tc:xacml:1.0:function:date-less-than">
      <Apply FunctionId=
"urn:oasis:names:tc:xacml:1.0:function:date-one-and-only"/>
        <EnvironmentAttributeDesignator
DateType=http://www.w3.org/2001/XMLSchema#date
AttributeId="urn:oasis:names:tc:xacml:1.0:environwent:current-date"/>
      </Apply>
      <AttributeValue
DataType="http://www.w3.org/2001/XMLSchema#date">
      2007-10-01
      </AttributeValue>
    </Condition>
  </Rule>
  <Rule RuleId="ruleId0002" Effect="Deny"/>
  <Obligations>
    <Obligation ObligationId="obligationId0001" FulfillOn="Deny">
      <AttributeAssignment AttributeId="subject"
DataType="http://www.w3.org/2001/XMLSchema#string">
      FileDeleteService
      </AttributeAssignment>
      <AttributeAssignment AttributeId="action"
DataType="http://www.w3.org/2001/XMLSchema#string">
      DeleteFile
      </AttributeAssignment>
    </Obligation>
  </Obligations>
</Policy>
``` d14

Obligation elements

Effect of "rejecting" rule 2
"Rejection" of obligation-type policy
Obligation fulfillment subject (File deletion service)
Obligation fulfillment action (Deletion of file)

F I G. 6 d14

```
<AttributeAssignment AttributeId="environment"
DataType="http://www.w3.org/2001/XMLSchema#date">
  2007-10-01
</AttributeAssignment>
```
} Obligation fulfillment environment (October 1, 2007)

FIG. 7 d14

```
<AttributeAssignment AttributeId="action"
DataType="http://www.w3.org/2001/XMLSchema#string">
  DisableFunctions
</AttributeAssignment>
...
<AttributeAssignment AttributeId="complement"
DataType="http://www.w3.org/2001/XMLSchema#string">
  Print
<AttributeAssignment>
```
} Obligation fulfillment action (Restriction on function)
} Obligation fulfillment complement (Printing)

FIG. 8

FILE-ACCESS CONTROL APPARATUS AND PROGRAM

CROSS-REFERENCE TO RELATED APPLICATIONS

This is a Continuation Application of PCT Application No. PCT/JP2008/069671, filed Oct. 29, 2008, which was published under PCT Article 21(2) in Japanese.

This application is based upon and claims the benefit of priority from prior Japanese Patent Application No. 2007-280800, filed Oct. 29, 2007, the entire contents of which are incorporated herein by reference.

BACKGROUND OF THE INVENTION

1. Field of the Invention

The present invention relates to a file-access control apparatus and a program, both designed to perform an access control for protecting document files in an appropriate manner. For example, the invention relates to a file-access control apparatus and a program, which can achieve an active control in accordance with the actions performed on document files and which can alter the control on accesses to document files.

2. Description of the Related Art

In recent years, the access control technology of controlling actions on specific information or processes in accordance with authorization data has become more and more important. This technology provides a system which can receive a request for an action on personal information or for an authorization processes and which can determine, in response to the request, whether the person who has made the request to perform the action should be allowed to perform the action, from the authorization data that person (i.e., subject) has and the access control rule or access control policy that shows the authorization data and an action-permission/rejection pattern.

The access control policy is generally regarded as a set of access control rules. Standard specifications of describing access control policies have been disclosed to the public and are now widely used. (See, for example, Tim Moses, "extensible Access Control Markup Language (XACML) Version 2.0," [online], [retrieved Oct. 1, 2007], the Internet URL: http://docs.oasis-open.org/xacml/2.0/XACML-2.0-OS-NORMATIVE.zip.) This exemplified standard specification describes some additional elements that define obligations. Each obligation is, generally, described as a "must or should execute specified operations." In this standard specification, however, each definition for each particular obligation is not defined in detail. Further, neither a guideline for handling the access control policy (including the obligations) nor a method of processing evaluation results is defined in this standard specification.

On the other hand, a method of controlling the access to document files is available, in which the authorization data is given as security attribute. In this method, the authorization data that authorizes the access to, for example, document files, is described as an action-permission/rejection, such as "permit to read" or "deny to modify," and is allocated to the user. Authorization data of this type is known as "access control matrix" or "access control list." Jpn. Pat. Appln. KOKAI Publication No. 2005-56418, for example, discloses a method of imparting authorization (rule), as "security container," to document files.

With the action-permission/rejection system, however, it has become difficult to describe detailed, flexible access control items, such as access time permitted, access locations permitted and more detailed access restriction. Recently, an access control system of access control policy type that can describe more detailed access control contents is required in the field where an access control policy, a license, or the like is required, particularly in the field of ordinary document applications.

BRIEF SUMMARY OF THE INVENTION

The background art described above can indeed describe more detailed access control contents. However, these access control contents determine only whether specific accesses can be permitted or not. The study of the invention hereof shows that, in order to control documents and the like, it appears necessary not only to determine whether a specific access be permitted or not, but also to perform a more active control on documents. For example, if a validation term is set to a document file and if this term expires, it may be demanded not only that the access to the document file be inhibited, but also that the document file be actively deleted. This is inevitably because, the document file remains existing if the access to it is inhibited, and a potential risk will remain in respect of the document file.

While any document file is being manipulated, its status changes. Therefore, the authority pertaining to the document file should be altered in some cases. More specifically, when a legitimate document issued through appropriate authorization is edited, the status of the file, which indicates a "legitimate document," changes to a status that shows a "non-legitimate document." If this is the case, it is desirable to change the authority status, from "printing permitted" to "printing inhibited."

In the conventional access control method, however, the authorization valid at the time of activating the document application is continuously applied, no matter whether the status has changed or not. Consequently, there is the risk of printing, by mistake, the non-legitimate document edited, because of its authority status of "printing permitted."

Thus, with the conventional access control method, it is impossible to achieve an active control or to alter the document-access control, in accordance with the manipulation of the document.

An object of the present invention is to provide a file-access control apparatus and a program, both capable of performing an active control and altering the access control of a document, in accordance with the manipulation of the document.

According to an aspect of the present invention, there is provided a file-access control apparatus designed to control accesses to a document file and comprising a storage device capable of storing document contents, each including an inhibition-type policy and an obligation-type policy, an evaluation control module, a document application unit and an external service unit, wherein the policy evaluation control module comprises: an executability data acquisition means for acquiring executability data items from the document application unit and the external service unit, respectively, and for holding the executability data items; an authentication-result acquisition means for acquiring result of authentication of a user and user attribute data, on the basis of a prescribed evaluation data list, on receiving, from the document application unit, event data representing an action made by the user and a document file stored in the storage device; means for sending evaluation data composed of the executability data, result of authentication and user attribute data, the event data, the inhibition-type policy, and the obligation-type policy on the basis of a prescribed evaluation data list, on receiving the executability data from the executability data acquisition means; means for comparing the authentication result, user attribute data and event data, all included in the evaluation data sent, respectively with the authentication result, user attribute data and event data, all prescribed in the inhibition-type policy, and for sending evaluation result showing the permission or inhibition prescribed in the inhibition-type policy, when the items included in the evaluation data are identical to the items included in the inhibition-type policy; obligation-type policy evaluation means for comparing the executability data, event data and evaluation result, all included in the valuation data, with the executability data, event data and evaluation result, all included in the obligation-type policy, and for sending control data including an obligation fulfillment subject and an obligation fulfillment action prescribed in the obligation-type policy, when the items included in the evaluation data are identical to the items included in the obligation-type policy; control management means for sending the control data on receiving the control data, on the basis of the obligation fulfillment subject included in the control data; and document-application control means for controlling the document application unit, on the basis of the obligation fulfillment action included in the control data sent from the control management means.

According to an aspect of this invention, the control data in accordance with actions is imparted to a document file, as obligation-type policy. Then, a policy evaluation/control module evaluates and executes the obligation-type policy contained in the document file. The execution of the obligation-type policy includes a process of controlling the document application on the basis of the obligation fulfillment action. An active control is therefore accomplished in accordance with the manipulation of the document, and the access control to the document can be altered.

BRIEF DESCRIPTION OF THE SEVERAL VIEWS OF THE DRAWING

FIG. 6 is a schematic diagram explaining an obligation-type policy used in the embodiment;

FIG. 7 is another schematic diagram explaining the obligation-type policy used in the embodiment;

FIG. 8 is still another schematic diagram explaining the obligation-type policy used in the embodiment;

DETAILED DESCRIPTION OF THE INVENTION

Embodiments of the present invention will be described with reference to the accompanying drawings. Note that each apparatus described below can be provided as a hardware configuration or a combination of hardware resources and software. Used as the software combined with the hardware resources is a program which is loaded into the computer of the associated apparatus from a network or a storage medium and which enables the associated apparatus to perform its function.

(First Embodiment)

Figure 1:
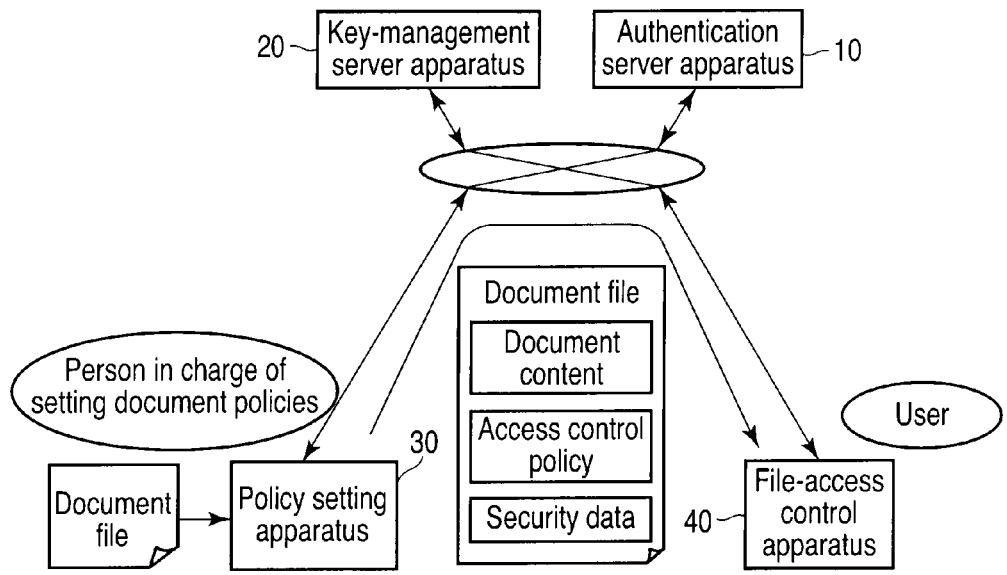
FIG. 1 is a diagram showing an exemplary configuration of a file-access control system which incorporates a file-access control apparatus according to a first embodiment of the present invention.

FIG. 1 is a diagram showing an exemplary configuration of the file-access control system which incorporates a file-access control apparatus according to a first embodiment of the present invention. The file-access control system comprises a key-management server apparatus 10, an authentication server apparatus 20, policy setting apparatus 30, and a file access control apparatus 40 which are connected to each other via a network. Note that neither the key-management server apparatus 10 nor the authentication server apparatus 20 are indispensable. That is, they need not be used if, for example, the user authentication and the key management are performed in the file access control apparatus 40. In this case, it suffices to add an authentication data storage device 11, a user authentication unit 13, a key-management data storage device 21, and a key management unit 23 (described later) to the file access control apparatus 40. Alternatively, the authentication data storage device 11 and the key-management data storage device 21 may be added to a storage device 41 (described later).

Figure 2:
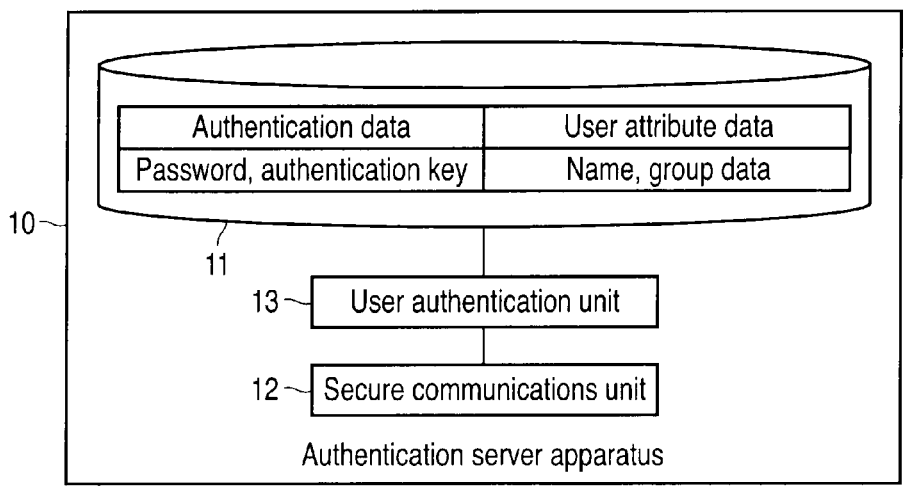
FIG. 2 is a block diagram showing the configuration of the authentication server apparatus provided in the embodiment.

As shown in FIG. 2, the key-management server apparatus 10 comprises an authentication data storage device 11, a secure communications unit 12, and a user authentication unit 13.

From and to the authentication data storage device 11, data can be read and written to and from the user authentication unit 13. Authentication data and user attribute data are stored beforehand in association in the authentication data storage device 11. The user can therefore be authenticated. The authentication data is the data for authenticating the user and is, for example, a password or an authentication key. The user attribute data is data that corresponds to name or a group (role) where a user belongs to. The group (role) is a user group in which a managerial position and a section in a company employing the user, and others are optionally set.

The secure communications unit 12 has the function of providing a secure communications path between the user authentication unit 13 and the policy setting apparatus 30 or file access control apparatus 40. The unit 13 and the 30 or 40 can therefore communicate with each other. Note that, the secure communications unit 12 may be included in the user authentication unit 13. The secure communications path can be achieved, for example, by using SSL (Secure Socket Layer) protocol or IPsec (IP Security protocol) or the like. It is the same in the secure communications unit 22, 32, and 43.

The user authentication unit 13 has the function of associating authentication data and user attribute data and then writing them to the authentication data storage device 11 upon receiving the authentication data and user attribute data from the policy setting apparatus 30 via the secure communications unit 12. The user authentication unit 13 has another function of authenticating the user of the file-access control apparatus 40 through the secure communications unit 12 and transmitting the authentication result and the user attribute data from the secure communications unit 12 to the policy evaluation control unit 44, upon receiving a request for user authentication from the file-access control apparatus 40 via the secure communications unit 12. Note that the authentication data and the user attribute data may be received from any other means than policy setting apparatus 30. For example, the server manager may input them through the input device (not shown) provided on the authentication server apparatus or through any other means.

Figure 3:
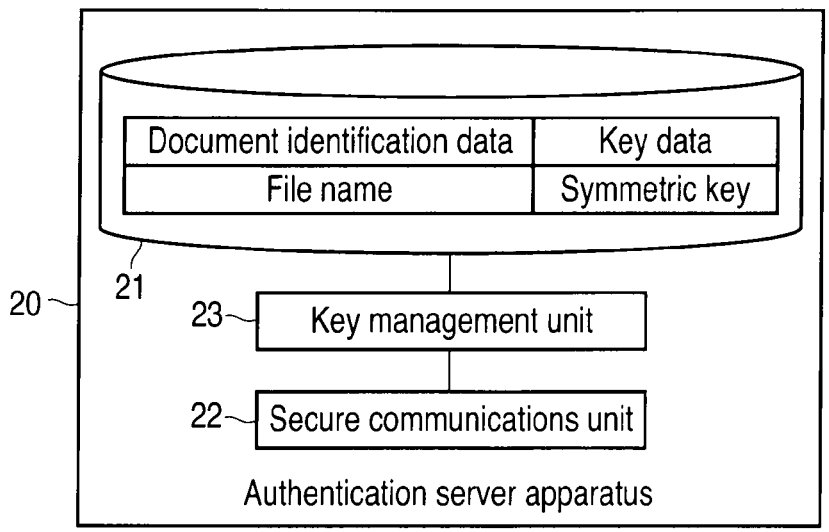
FIG. 3 is a block diagram showing the configuration of a key-management server apparatus provided in the embodiment.

As shown in FIG. 3, the key-management server apparatus 20 comprises a key-management data storage device 21, a secure communications unit 22, and a key management unit 23.

To and from the key-management data storage device 21, data can be written and read from and to the key-management data storage device 21. In the key-management data storage device 21, document identification data and key management data are stored and associated with each other. The document identification data is data, such as file name, which can identify a document file. The key management data is data, such as key data for symmetric key encryption, which is used to encrypt document files.

The secure communications unit 22 has the function of providing a secure communications path between the key management unit 23 and the policy setting apparatus 30 or file access control apparatus 40. The unit 23 and the apparatus 30 or apparatus 40 can therefore communicate with each other. Note that the secure communications unit 22 may be included in the key management unit 23.

The key management unit 23 has the function of associating the document identification data and the key data with each other and writing them to the key-management data storage device 21 upon receiving the document identification data and the key data from the policy setting apparatus 30 through the secure communications unit 12. The key management unit 23 has another function of transmitting the key data read from the key-management data storage device 21, from the secure communications unit 22 to the file access control apparatus 40, on the basis of the document identification data contained in a key transmission request, upon receiving the key transmission request via the secure communications unit 22 from the file access control apparatus 40.

Figure 4:
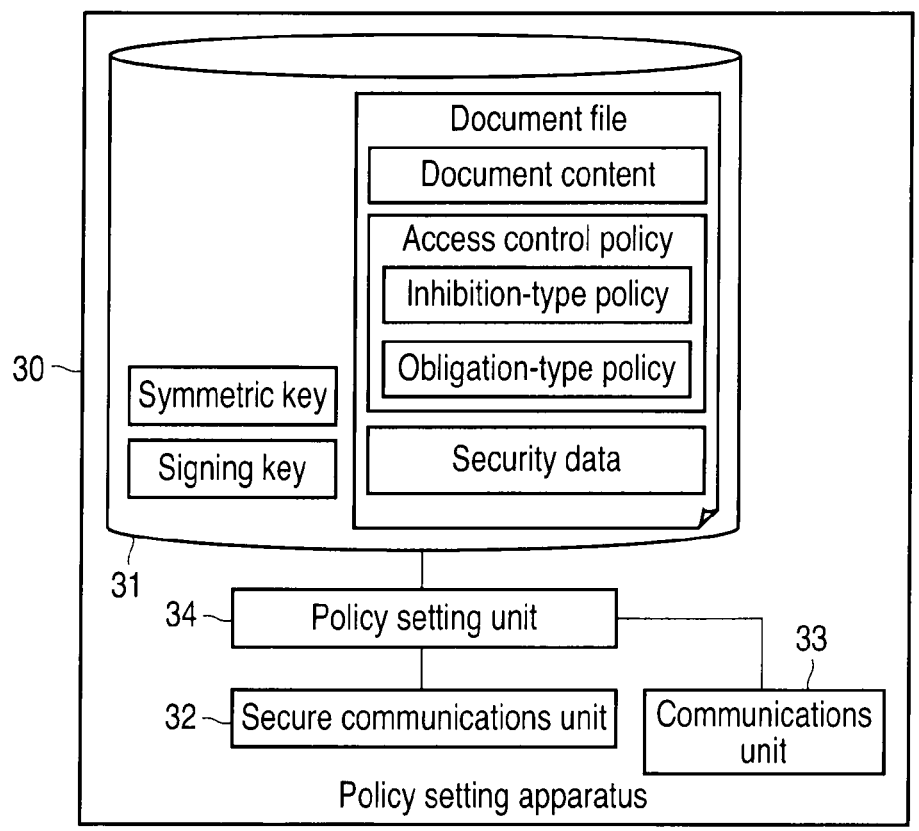
FIG. 4 is a block diagram showing the configuration of the policy setting device provided in the embodiment.

As shown in FIG. 4, the policy setting apparatus 30 comprises a policy-setting storage device 31, a secure communications unit 32, a communications unit 33, and a policy setting unit 34.

From and to the policy-setting storage device 31, data can be read and written from and to the policy setting unit 34. The policy-setting storage device 31 stores document files, a symmetric key and a signing key. The signing key may be either the signing key of the policy-setting storage device 31 (i.e., secret key of the policy-setting storage device 31) or the signing key of the user terminal (i.e., secret key of the user terminal).

The secure communications unit 32 has the function of providing a secure communication path between the policy setting unit 34 and the key-management server apparatus 10 or key-management server apparatus 20. The unit 34 and the unit 10 or 20 can therefore communicate with each other. Note that the secure communications unit 32 may be included in the policy setting unit 34.

The communications unit 33 has the function of achieving communication between the policy setting unit 34 and the file access control apparatus 40.

The policy setting unit 34 has the function of transmitting the authentication data and the user attribute data to the key-management server apparatus 10 through the secure communications unit 32, when operated by the person in charge of setting document policies. The policy setting unit 34 has another function of transmitting document identification data and key management data to the key-management server apparatus 20 via the secure communications unit 32, when operated by the person in charge of setting document policies. The policy setting unit 34 has still another function of setting the access control policy for the document file, which is stored in the policy-setting storage device 31, to a value input by the person in charge of setting document policies or to a value preset beforehand. Further, the policy setting unit 34 has the function of transmitting the document file stored in the policy-setting storage device 31 from the communications unit 33 to the file access control apparatus 40.

Moreover, the policy setting unit 34 has the function of encrypting the document content or both the document content and the access control policy in such a form that they may no longer be isolated from each other. "Encrypting the document content and the access control policy in such a form that they may no longer be isolated from each other" is to encrypt the document content and the access control policy altogether. The policy setting unit 34 may have the function of generating a digital signature by using the signing key (i.e., secret key of the policy setting apparatus 30) stored in the policy-setting storage device 31, in order to prevent the (encrypted) document content and the access control policy from being altered.

Figure 5:
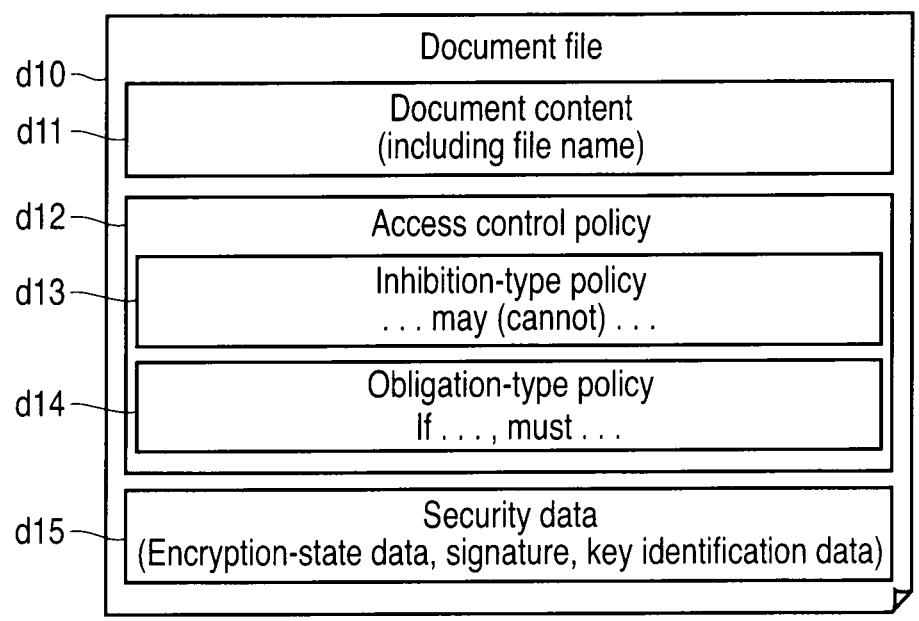
FIG. 5 is a schematic diagram showing an exemplary configuration of a document file according to the embodiment.

FIG. 5 shows an exemplary configuration of the document file. The document file d10 includes a document content d11, an access control policy d12, and security data d15.

The document content d11 contains various data items such as a file name that is used as document identification data, a text that is a so-called "document content," and macro. The document content d11 may contain not only text data, but also data items such as drawings and programs. Furthermore, the document content d11 may contain document attributes. The document attributes that can be used as needed are, for example, the document preparer (i.e., name/section), the document owner (i.e., section in charge of managing the document), the date of preparation (i.e., date of final edition), the classification level (i.e., top secret, secret, in-house only, or publication), the status data (final/draft), the disclosure status (i.e., disclosed or not disclosed), the term of validation, the persons authorized to use the document, and the like. In some cases, the document attributes may be updated in accordance with the control data included in an obligation-type policy d14, which will be described later.

The access control policy d12 describes the conditions for accessing to the document, which have been set by a document-policy issuer. More specifically, the access control policy d12 describes two types of policies, i.e., an inhibition-type policy d13 and an obligation-type policy d14.

The inhibition-type policy d13 is a set of rules describing "The access subject should permit or inhibit the action." The "access subject" is a subject that makes an action, such as the user or the role. The "action" is the preparation of a new document, the reading (opening) of the document, editing, printing or copying of the document, or duplicating of part or entirety of the document content. Hence, the inhibition-type policy d13 includes rules describing, for example, "User A should be permitted to read the document," "only the preparer (section) can edit the document."

On the other hand, the obligation-type policy d14 is a set of rules describing "If conditions are satisfied, the control should be performed." Note that the "conditions" are, for example, whether the user is authenticated, whether the document attributes exist, and the environment data (e.g., time data). Instead, the "conditions" may be an AND (logical product) or OR (logical sum) of various conditions. The "control" is the controlling of the document application, the controlling of external service, or the changing of the access control policy. The external service will be described later in detail.

The obligation-type policy d14 will be explained with reference to the examples shown in FIG. 6 to 8. The obligation-type policy d14 can use some elements to express the content of obligation (equivalent to the "control" in the obligation-type policy). These elements are: "subject," "action," "resource," "environment," "complement," and the like.

The "subject" is an entity which fulfills the obligation. The "action" is an action that the subject performs to fulfill the obligation. The "resource" is an object for which the subject performs the obligation. The "environment" is in the environment in which the subject fulfills the obligation, and the "complement" makes up for the action the subject performs to fulfill the obligation.

These elements are illustrated in FIG. 6, by utilizing XACML V2.0 described in Non-Patent Document 1.

FIG. 6 shows the contents of obligation using the Attribute-Assignment element. That is, the elements constituting the obligation are represented as the AttributeId attribute value of the AttributeAssignment element. The AttributeId attribute value "subject" represents the subject who should fulfill the obligation. If this AttributeAssignment element is explicitly designated, the subject designated must perform the obligation. If this AttributeAssignment element is (implicitly) omitted, the subject that has requested for evaluation will fulfill the obligation. In the exemplary description, the service name is expressed as a character string. To make the description more specific, the DataType attribute may be imparted with a value that corresponds to the form that should be designated. This holds true of the AttributeAssignment element to any following obligation elements.

The AttributeAssignment element having the AttributeId attribute value "action" represents an action that should be performed to fulfill the obligation. In principle, this element should better be explicitly designated. Like an AttributeAssignment element that has AttributeId attribute value "subject," this element value represents the action in the form of a character string. To render it more specific, the DataType attribute value may be changed to one that corresponds to the form whose DataType attribute value should be designated. In this example, the element value is "DeleteFile," which designates the deletion of the file. The file to delete does not designate the AttributeAssignment element having the AttributeId attribute value "resource." This file is therefore interpreted as identical to the Resource element contained in the request. If explicitly designated as a union resource identifier (URL), the resource (file) designated will be deleted. In this case, it suffices to define the resource as an AttributeAssignment element that has an AttributeId attribute value "resource."

This exemplary description includes no AttributeAssignment elements that have AttributeId attribute value "environment." Nonetheless, any AttributeAssignment elements that have AttributeId attribute value "environment" may be described as shown in FIG. 7, if it is necessary to designate the environment in which to perform the obligation.

Further, the exemplary description does not include AttributeAssignment elements that have AttributeId attribute value "complement," either. However, such an AttributeAssignment element will be described if a content exists, in which an AttributeAssignment element having an AttributeId attribute value "action" must be supplemented. If the AttributeAssignment element having, for example, AttributeId attribute value "action" represents an action of limiting a particular function, it will be used to represent the function to be limited. In the following case, an AttributeAssignment element having, for example, the AttributeId attribute value "action" may define the value "DisableFunctions" indicating that the function should be limited. If this is the case, the function to limit can be defined by the Attribute-Assignment element having the AttributeId attribute value "complement." In the instance of FIG. 8, AttributeAssignment element value "Print" limits the "printing" function.

In the examples of FIGS. 6 to 8, the chance of fulfilling the obligation (equivalent to the "condition" described in the above-mentioned obligation policy) is the type (i.e., FulfillOn attribute) defined in XACML V2.0.

The descriptions of FIGS. 6 to 8 are examples demonstrated to show that the description of XACML V2.0 can be expanded to describe policies required in the present embodiment. Thus, policies described in different manners can be used if they represent the elements necessary in this embodiment can be used, no matter whether they are described by any other methods or in accordance with XACML V2.0.

The security data d15 describes encryption-state data, encryption-algorithm identification data, and verification-key identification data. The encryption-state data represents whether the document content d11 and the like are encrypted or not. The encryption-algorithm identification data can identify the algorithm used in encrypting the document content. The verification-key identification data can identify the key used in encrypting the document content. The security data d15 describes may describe the digital signature and verification-key identification data, too. The digital signature has been generated by the policy setting unit 34. The verification-key identification data can identify a verification key for verifying the digital signature. The encryption-state data, encryption-algorithm identification data and verification key identification data may not be included in the security data. Instead, the encryption-state data, encryption-algorithm identification data and verification key identification data may be stored in a storage server apparatus or the various storage devices of the key-management server apparatus 20. If so, the source address data (e.g., URL or URI) designating the storage locations where these data items are stored may be included in the security data, in place of these data items. In this case, the encryption-state data, the encryption-algorithm identification data, and the verification key identification data can be changed in the key-management server apparatus 20, if they should be changed.

The file-access control apparatus 40 will be described below.

Figure 9:
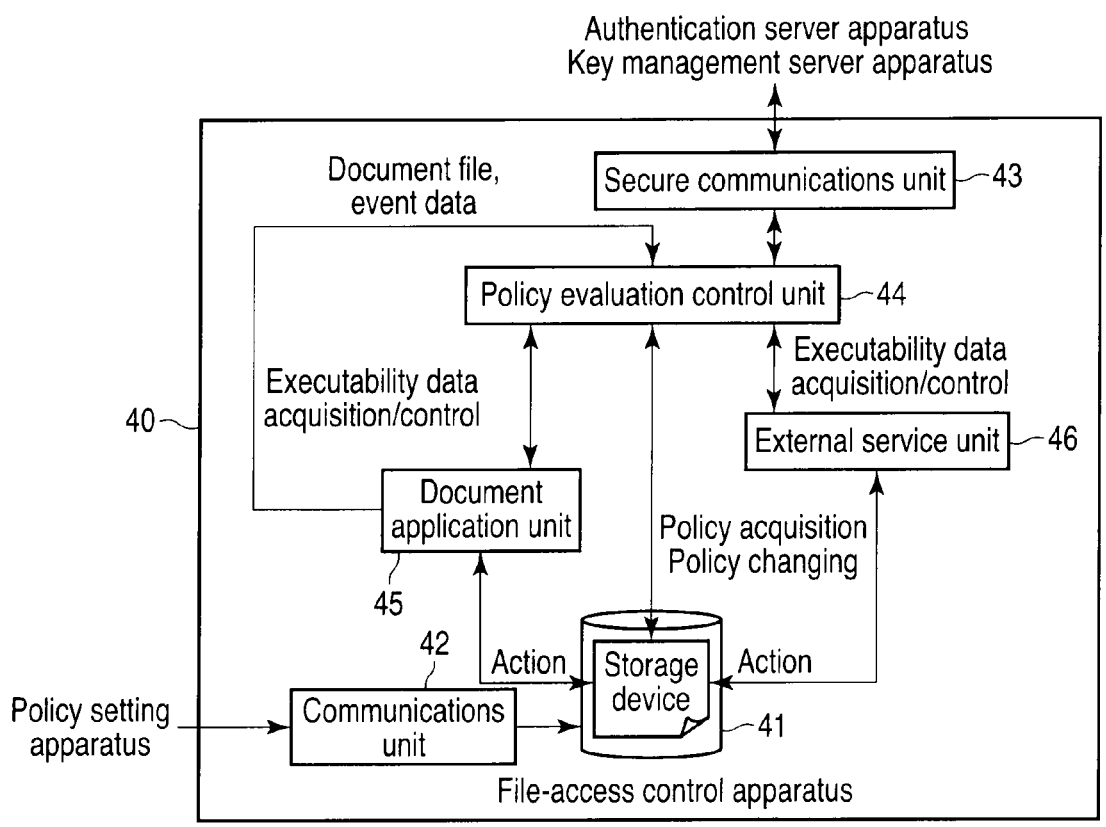
FIG. 9 is a block diagram showing the configuration of a file-access control apparatus in the embodiment.

As shown in FIG. 9, the file-access control apparatus 40 comprises a storage device 41, a communications unit 42, a secure communications unit 43, a policy evaluation control unit 44, a document application unit 45, and an external service unit 46.

Data can be read from the units 42 to 46 to the storage device 41, and can be written to the units 42 to 46 from storage device 41. The storage device 41 is configured to store the document file d10.

The communications unit 42 is to communicate with the policy setting apparatus 30. It has the function of receiving the document file d10 from the policy setting apparatus 30 and writing the document file d10 to the storage device 41. The communications unit 42 may be included in the external service unit 46.

The secure communications unit 43 has the function of providing a communication path between the file-access control apparatus 40 to the authentication server apparatus 10 and the key-management server apparatus 20. The apparatuses 40 can therefore communicate with the apparatus 10 and 20 each other. The unit 43 has another function of acquiring key data and the verification key from a server apparatus (not shown) or the key-management server apparatus 20 and sending the key data and the verification key, thus acquired, to the policy evaluation control unit 44, in accordance with the key identification data received from the policy evaluation control unit 44, the verification key identification data or the above-mentioned source address data. The key data corresponds to the document file, and the verification key will be used to verify the digital signature. The secure communications unit 43 may be included in a decryption/signature verification unit 44b and an evaluation data acquisition unit 44c, both provided in a policy evaluation control module 44 that will be described later.

The policy evaluation control module 44 is an tamper-resistant module that has the function of evaluating the access control policy d12 described in the document file d10, based on event data and the document file, both input from the document application unit 45; the function of controlling the document application unit 45 and the external service unit 46 in accordance with the result of the evaluation; and the function of changing the document attributes of the document file d10 and access control policy d12, both stored in the storage device 41, in accordance with the result of the evaluation. The event data is command data generated when an action is performed, inputting a command for preparing, reading (opening), editing, printing or copying the document or for duplicating a part or entirety of the document. The word "tamper-resistant" means that the module is resistant to unauthorized change of, or an attack on, the function of the module.

Further, the policy evaluation control module 44 has the function of acquiring the result of authentication and the user attribute data from the authentication server apparatus 10 through the secure communications unit 43; the function of acquiring the key data from the key-management server apparatus 20 through the secure communication unit 43; and the function of acquiring the status data about the document application unit 45 and external service unit 46 (i.e., data showing whether these units can be controlled). The policy evaluation control module 44 is mounted as the plug-in software of the document application, as in most cases. The operation unit (not shown) executes the programs of the plug-in software, thus performing various functions. Nonetheless, the policy evaluation control module 44 is not limited to plug-in software. Programs of non-plug-in software may be executed to perform the various functions. Moreover, the policy evaluation control module 44 may be downloaded from a specific Web site of the vender of the document application or a service-providing vender and be installed into the file-access control apparatus 40 and may then be constituted in the file-access control apparatus 40.

The document application unit 45 has the function of inputting to the policy evaluation control module 44 the event data and document file, both corresponding to an action externally made on the document file d10; and the function of controlling the action on the document content d11, when controlled by the policy evaluation control module 44. The function of "controlling action" includes the function of permitting or inhibiting the action and the function of performing the action. The function of "permitting or inhibiting action" is, for example, to permit only the reading of the document content d11 or to inhibit the printing of the document content. The function of "performing action" is to, for example, delete the document content d11. The document application unit 45 performs the various functions as the operation process apparatus (not shown) executes a tamper-resistant document application program. It is desired that the document file d10 should be protected, not manipulated from outside, as long as it is being manipulated by the document application unit 45. This can be accomplished, for example, by duplicating the document file in a memory as protected data, by manipulating the document file duplicated, and by reflecting the result of the manipulation on the original document file. In this case, not the document file, but the pointer of the document file duplicated in the memory is input to the policy evaluation control module 44. The policy evaluation control module 44 manipulates the document file now stored in the memory.

The external service unit 46 has a service function provided on the platform at which to execute the document application. The service function can be performed, for example, as a mail service function or a function of deleting the document file d10. The external service unit 46 performs various functions as the operation process apparatus (not shown) executes external service programs.

Figure 10:
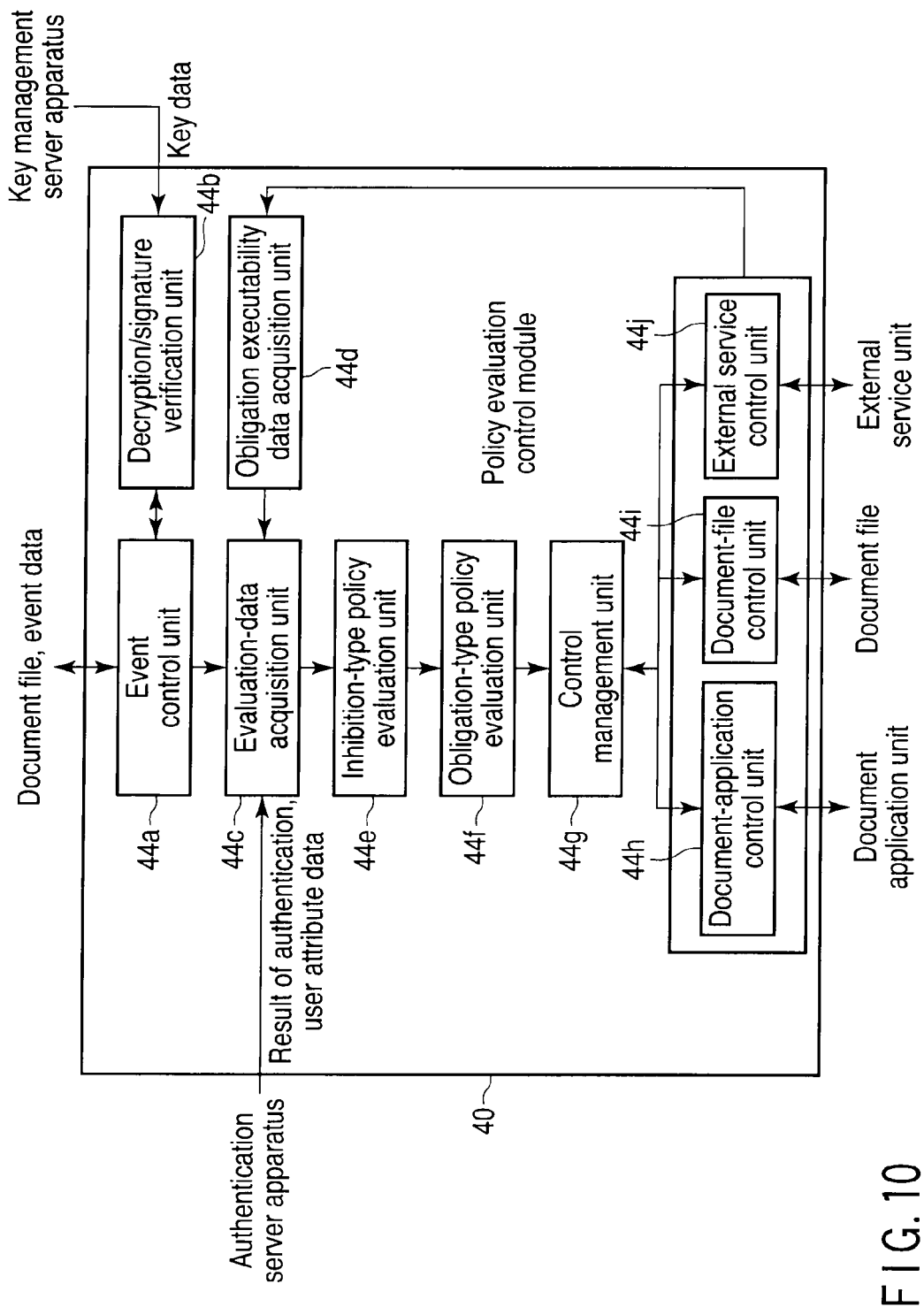
FIG. 10 is a block diagram showing the configuration of the policy evaluation/control module provided in the embodiment.

FIG. 10 shows the internal configuration of the policy evaluation control module 44. The policy evaluation control module 44 has an event control unit 44a, a decryption/signature verification unit 44b, an evaluation-data acquisition unit 44c, an obligation execution executability data acquisition unit 44d, an inhibition-type policy evaluation unit 44e, an obligation-type policy evaluation unit 44f, a control management unit 44g, a document-application control unit 44h, a document-file control unit 44i, and an external service control unit 44j.

The event control unit 44a has the function of determining whether event data represents the reading (opening) of the document or not, upon receiving event data and the document file d10 from the document application unit 45; the function of determining, in accordance with the security data d15 in the document file d10, whether the document content d11 and access control policy d12 have been encrypted, if the event data represents the reading of the document; and the function of determining whether the security data d15 includes a digital signature.

The event control unit 44a further has the function of sending the document file d10 to the decryption/signature verification unit 44b, causing the unit 44b to decrypt the document file d10 and verity the signature, if the document content d11 and the like have been encrypted or the security data d15 includes a digital signature; and the function of sending the document file d10 including the decrypted document content d11 and access control policy d12, and the event data, to the evaluation-data acquisition unit 44c, if the decryption/signature verification unit 44b has successfully performed the processes. The process of verifying the signature is, in short, a process the file-access control apparatus 40 performs to verify the signature included in the security data d15, by using a public key corresponding to the signing key (e.g., secret key of the policy setting apparatus 30), thus determining whether the communication partner is a legitimate one and whether the document content d11 has not been altered.

The event control unit 44a has another function of sending the event data and the document file opened at the reception of the event data, to the evaluation-data acquisition unit 44c, if the event data represents, not "reading of document," but "saving of document" or "printing of document."

In some system, any document files d10 may not be encrypted at all, and no digital signature is put to the document file d10. In this case, the security data d15, the event control unit 44a and the decryption/signature verification unit 44b can be omitted, and the event data and document file d10 input from the document application unit 45 are input to the evaluation-data acquisition unit 44c.

The decryption/signature verification unit 44b has the function of determining whether the document content d11 and access control policy d12 have been encrypted, from the security data d15 about the document file d10, or the security data d15 includes a digital signature, upon receiving the document file d10 from the policy evaluation control module 44; the function of decrypting the document content d11 and the like using key data, if the document content d11 and the like are found encrypted; the function of verifying the digital signature using a verification key, if the security data d15 includes a digital signature; and the function of sending the result of decryption and the result of verification to the event control unit 44a.

The decryption/signature verification unit 44b has the function of acquiring, on the basis of the security data d15, the key data for decryption from the key-management server apparatus 20. Instead, the unit 44b may use a different means to acquire the key data. Similarly, the decryption/signature verification unit 44b may use a different means to acquire the verification key, though it has the function of acquiring the verification key from the key-management server apparatus 20 on the basis of the security data d15. For example, if the signing key used to generate a digital signature is the user's signing key, the verification key may be acquired by reading from the storage device 41 of the file-access control apparatus 40. The decryption/signature verification unit 44b may fail to decrypt the file or verify the signature. If this is the case, the unit 44b ceases to operate. It only the document content d11 is found encrypted, the decryption/signature verification unit 44b may not decrypt the content d11 at this point, and may later decrypt the content d11 when the inhibition-type policy d13 or the obligation-type policy d14 is evaluated.

The evaluation-data acquisition unit 44c has the function of acquiring from an external apparatus the valuation data in accordance with the type of the evaluation data described in a prepared evaluation data list or which need for evaluating the access control policy d12 included in the document file d10 input. The "evaluation data list" is a list describing all types of evaluation data that may be described in the access control policy d12, no matter whether they are necessary to evaluate the access control policy d12 included in the document file d10 input. The evaluation data list is described as part of, for example, a program code.

The evaluation data can be, for example, the result of the user authentication, the user attribute data, the time data, the executability data of external-functions, or the like. The evaluation data also includes the data capable of identifying the "access subject" defined in connection with the above-mentioned inhibition-type policy, and the data capable of evaluating the "condition" defined in connection with the above-mentioned obligation-type policy.

The evaluation-data acquisition unit 44c further has the function of transmitting, on receiving the document file and the event data from the event control unit 44a, a user-authentication request from the secure communications unit 43 to the authentication server apparatus 10 in order to acquire the user authentication result and the user attribute data; and the function of acquiring the authentication result (success or failure) and the user attribute data from the authentication server apparatus 10.

The evaluation-data acquisition unit 44c has the function of acquiring time data and the like from the external apparatus, if the time data is necessary.

The evaluation-data acquisition unit 44c further has the function of sending a request for obligation executability data to the obligation executability data acquisition unit 44d, in order to acquire obligation executability data from the obligation executability data acquisition unit 44d, and the function of acquiring obligation executability data from the obligation executability data acquisition unit 44, and the function of acquiring updated executability data, upon lapse of a prescribed time, from the obligation executability data acquisition unit 44d.

The evaluation-data acquisition unit 44c has still another function of sending, to the inhibition-type policy evaluation unit 44e, the access control policy d12 included in the document file d10, the event data, and the evaluation data (e.g., the user authentication result, the user attribute data, the time data, the external-function executability data, and the like).

The obligation executability data acquisition unit 44d has the function of acquiring external-function executability data items, which will be used to evaluate the obligation-type policy d14, from the document-application control unit 44h, document-file control unit 44i and an external service control unit 44j, respectively, and holding these data items; the function of sending the executability data items to the evaluation-data acquisition unit 44c, upon receiving a request for these data items; and the function of sending the executability data items to the evaluation-data acquisition unit 44c if these data items have been updated. Note that the "external-function control" means the control of the document application unit 45, the control of the external service unit 46, and the control of the document file d10, and the like. The executability data items indicates that the external functions can be controlled or cannot be controlled, in accordance with whether the document application unit 45 operates and the various types of external service unit 46 are in service.

The obligation executability data acquisition unit 44d may acquire the executability data items when the event data and the document file are input to the policy evaluation control module 44 or when the evaluation-data acquisition unit 44c makes a request for the executability data items. Alternatively, the obligation executability data acquisition unit 44d may acquire and update the executability data items at regular intervals.

The inhibition-type policy evaluation unit 44e has the function of evaluating the inhibition-type policy d13 described in the access control policy d12, based on the event data and the evaluation data, both input from the evaluation-data acquisition unit 44c; and the function of sending the event data, the evaluation data and the result of evaluation (either permission or inhibition) of the inhibition-type policy d13, to the obligation-type policy evaluation unit.

The function of "evaluating the inhibition-type policy d13" is to output the result of evaluation (either permission or inhibition) in connection with those of the rules described in the inhibition-type policy d13, which agree with the event data in terms of "action" and with the "access subject" contained in the evaluation data. More specifically, the event data input may represent, for example, the reading and the rule of "User A can read the document" is described in the inhibition-type policy. In this case, the result of authentication of User A has been input as evaluation data, and User A is permitted to read the document if he or she has been authenticated in success.

More precisely, to evaluate the inhibition-type policy d13, the inhibition-type policy evaluation unit 44e compares the authentication result, user attribute data and event data, all acquired, respectively with the authentication result, user attribute data and event data, all already described in the inhibition-type policy d13. If the authentication result, user attribute data and event data, all acquired, are identical to the authentication result, user attribute data and event data which are described in the inhibition-type policy d13, the unit 44e outputs the evaluation result showing either permission or inhibition described in the inhibition-type policy d13. It is desired that the inhibition-type policy d13 should be described to have no appropriate rules or no rules whatever. This is achieved by describing, in the inhibition-type policy d13, the default evaluation result that is output if the policy d13 describes no appropriate rules.

The obligation-type policy evaluation unit 44f has the function of evaluating the obligation-type policy d14, based on the event data and evaluation data input from the inhibition-type policy evaluation unit 44e and the result of evaluating the inhibition-type policy evaluation unit 44e, and the function of outputting, to the control management unit 44g, the control data about the control management unit 44g should perform.

The function of "evaluating the obligation-type policy d14" is to determine whether the "condition" of the each rule described in the obligation-type policy d14 is satisfied, and to output the "control data" of the rule if the condition is satisfied.

To be more specific, assume that the obligation-type policy d14 describes the rule of "notify the user name by mail if the event data represents the reading, if the result of evaluating the inhibition-type policy is permission and if mail service can be performed." Then, the obligation-type policy evaluation unit 44f outputs control data of "notify the user name by mail" to the control management unit 44g if the event data represents the "reading," if the result of evaluating the inhibition-type policy d13 is "permission" and if the mail-service executability data is "control possible."

Also assume that the obligation-type policy d14 describes the rule of "delete the document content if the date is Jan. 1, 2008 or thereafter." Then, the unit 44f outputs control data of "delete the document content" to the control management unit 44g if the time data contained in the evaluation data accords with the condition. At this point, the control data is output, in its entirety, to the control management unit 44g if the condition meets a plurality of rules.

More precisely, to evaluate the obligation-type policy d14, the obligation-type policy evaluation unit 44f compares the executability data, event data and evaluation data, all acquired, with the executability data, event data and evaluation data, all described in the obligation-type policy. If the data items acquired are identical to the data items described in the obligation-type policy, respectively, the obligation-type policy evaluation unit 44f supplies the control data including the obligation fulfillment subject and the obligation fulfillment action described in the obligation-type policy d14, to the control management unit 44g.

The control management unit 44g has the function of sending the control data it has just received from the obligation-type policy evaluation unit 44f, to the document-application control unit 44h, document-file control unit 44i and an external service control unit 44j, in a prescribed order and in accordance with the obligation fulfillment subject.

The document-application control unit 44h has the function of controlling the document application unit 45, based on the obligation to fulfill described in the control data supplied from the control the control management unit 44g. The word "controlling" means the control of the actions performed on the document content d11, such as the control for permitting the reading, printing and deletion of the document content d11. Further, the document-application control unit 44h has the function of acquiring the obligation executability data from the document application unit 45 in response to a request made by the obligation executability data acquisition unit 44d, and then sending this data to the obligation executability data acquisition unit 44d.

The document-file control unit 44i has the function of change the access control policy d12 and security data d15 of the document file d10 stored in the storage device 41, based on the obligation to fulfill, which is described in the control data supplied from the control management unit 44g. That is, the unit 44i can change, for example, the rule of the access control policy d12 and the security data d15. To change the rule of the access control policy d12, the unit 44i may change either the inhibition-type policy d13 or the obligation-type policy d14. To change the security data d15 is, for example, not to encrypt the file or to change the key data and then encrypt the file with the key data changed. The document-file control unit 44i may have another function of changing the document attribute of the content d11 of the document file d10 stored in the storage device 41, based on the obligation to fulfill, which is described in the control data supplied from the control the control management unit 44g. To change the document attribute, the status data may be changed from "final" to "draft", for example.

The external service control unit 44j has the function of controlling the external service unit 46, based on the obligation to fulfill, which is described in the control data supplied from the control management unit 44g. "Controlling the external service unit 46" means that the mailer is forcedly activated or the mail is transmitted in the mail service, for example. That is, the external service control unit 44j may have the function of activating the mailer, i.e., external service unit 46, in accordance with the obligation to fulfill. The external service control unit 44j may have the function of perform a control to notify the mailer, thus activated or previously activated, of the user name by sending a mail to the mailer. The destination of notification is, for example, the policy setting apparatus 30, but not limited thereto. Any other destination can be set to perform the obligation. The external service control unit 44j further has the function of acquiring the obligation executability data pertaining to any external service.

The event data input to the policy evaluation control module 44 represents the "saving of document," and the security data d15 in the document file input designates encryption. In this case, it is desirable to encrypt the document file again and save the same. This can be accomplished because the policy evaluation control module 44 has the function of encrypting the document content, in the same way as the policy setting unit 34 does, or of encrypting the document content so that the content may not be separated from the access control policy.

Figure 11:
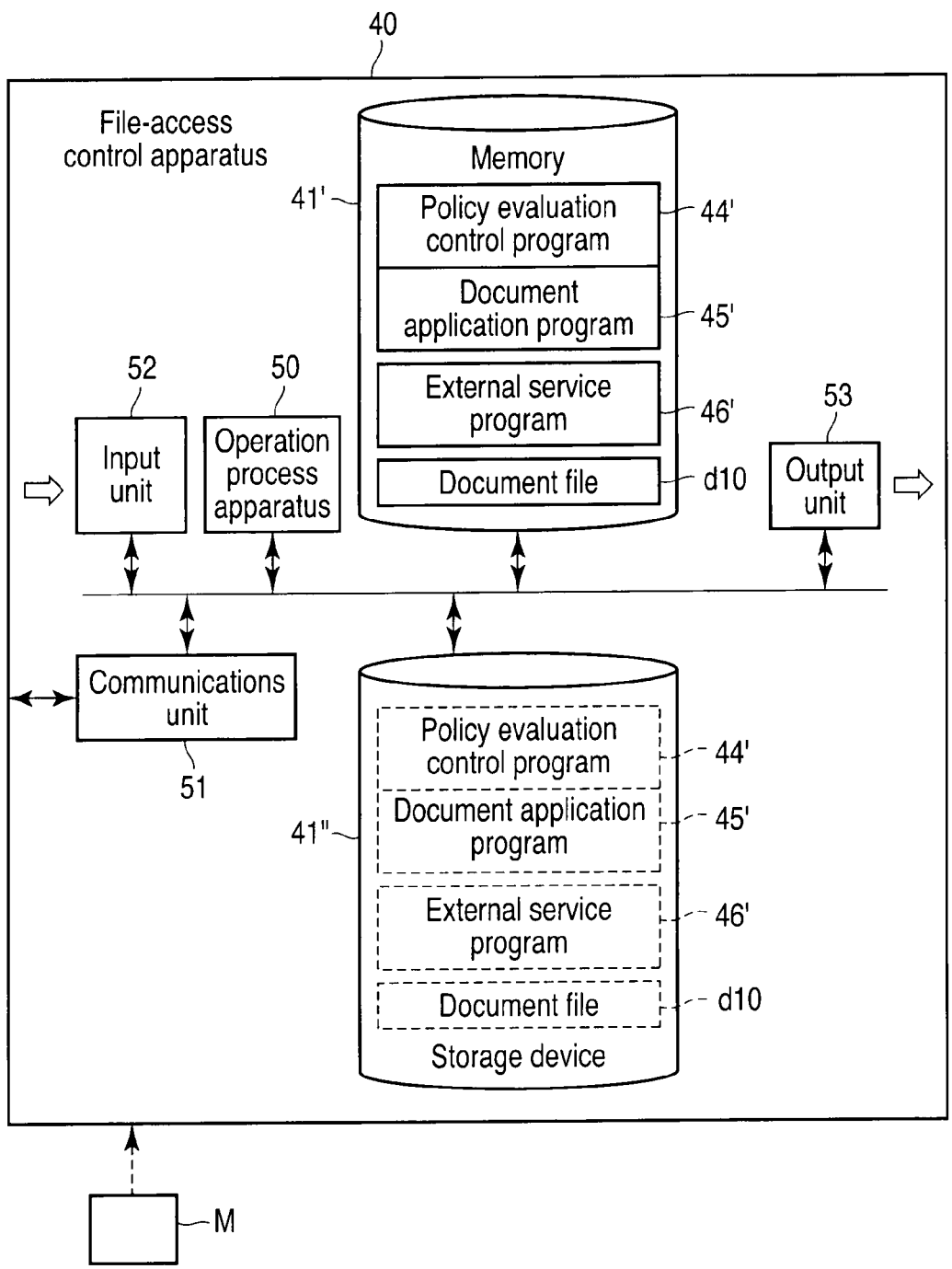
FIG. 11 is a schematic diagram showing a combination of hardware resources and software resources, which is used in the file-access control apparatus according to the embodiment.

The file-access control apparatus 40 described above may have such a configuration as shown in FIG. 11. In FIG. 11, the storage device 41 is equivalent to a memory 41' when the program is executed, and is equivalent to the memory 41' and a memory 41" when the document file d10 is updated. The memory 41' is a memory such as RAM, and the memory 41" is an auxiliary storage device such as a hard disk drive.

The communications unit 42 and the external service unit 46, both described above, may be replaced by an external service program 46', an operation process apparatus 50, a communications unit 51, an input unit 52, and an output unit 53. The external service program 46' includes an external mail program that is equivalent to the communications unit 42. The operation process apparatus 50 is designed to execute programs to implement various functions. The communications unit 51 is an interface that achieves communication between the network and the file-access control apparatus 40. The input unit 52 is an input device such as a keyboard. Alternatively, the input unit may be an input interface for an external input device, if any. The output unit 53 is a display such as a liquid crystal display. Nonetheless, the output unit 53 may be an output interface for an external display, if any. The output unit 53 may be connected to an external printer. In this case, an output interface may be provided for the external printer.

The secure communications unit 43 and the policy evaluation control module 44 may be replaced by a document application program 45', communications unit 51 and operation process apparatus 50.

The document application unit 45 described above may be replaced by the document application program 45', operation process apparatus 50, input unit 52 and output unit 53.

The programs 44', 45' and 46' are loaded, each from a computer-readable storage medium M, into the file-access control apparatus 40. The operation process apparatus 50 executes these programs thus loaded, implementing various functions.

Figure 12:
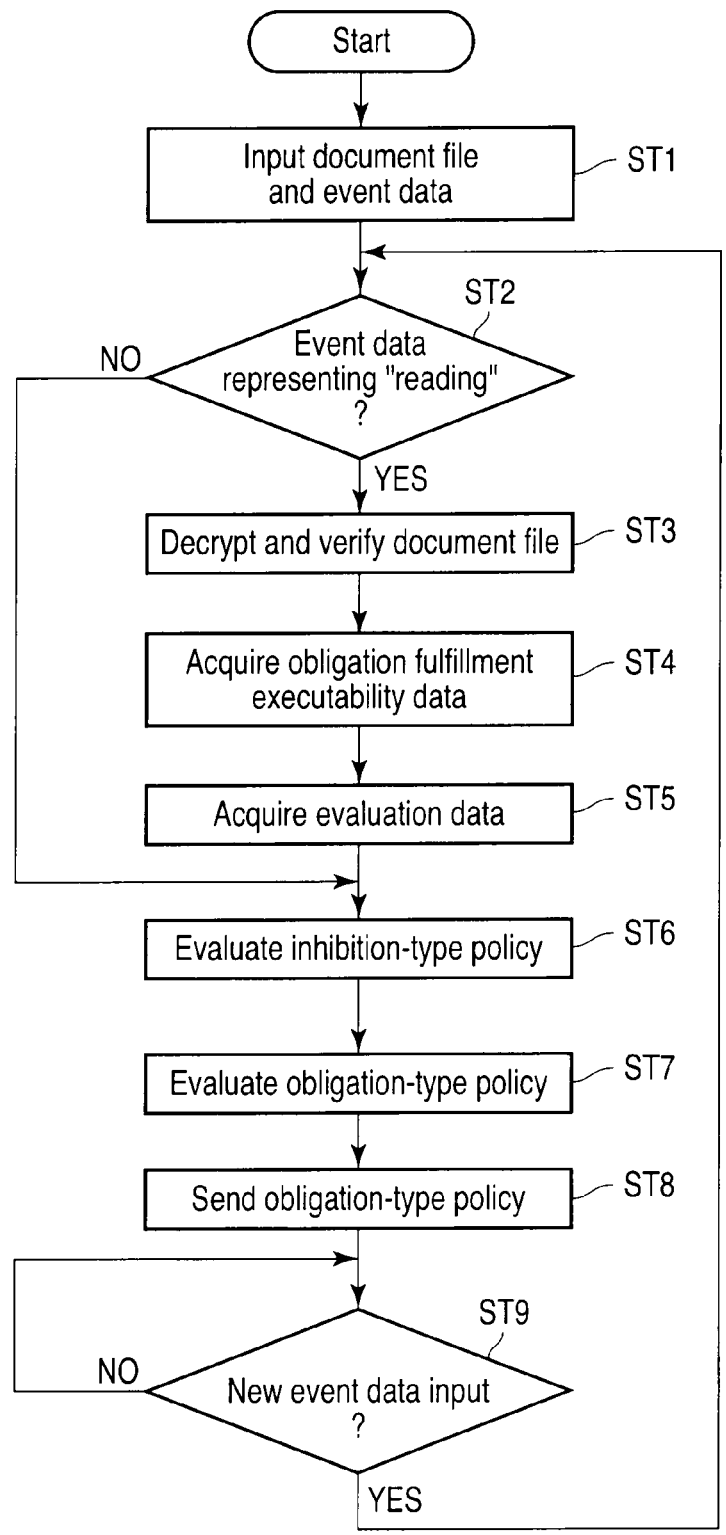
FIG. 12 is a flowchart explaining the operation sequence of the embodiment.

How the file-access control system configured as described above operates will be explained with reference to the flowcharts of FIGS. 12 and 13.

(Preparation)

Assume that in the authentication server apparatus 10, the authentication data and user attribute data received from the policy setting apparatus 30 are written, associated with each other, to the authentication data storage device 11.

Also assume that the policy setting apparatus 30 sets the access control policy d12 to the document content d11.

In the policy setting apparatus 30, the policy setting unit 34 sets the access control policy d12 of the document file d10 stored in the policy-setting storage device 31 to a value input by the person in charge of setting document policies or to a prescribed value.

At this point, the policy setting unit 34 encrypts the document content d11 and the access control policy d12 with the symmetric key provided in the policy-setting storage device 31. The policy setting unit 34 further uses the signing key stored in the policy-setting storage device 31, generating a digital signature for the document content d11 and access control policy d12 that have been encrypted.

Further, the policy setting unit 34 generates security data d15 containing encryption-state data, encryption-algorithm identification data, key identification data, digital signature and verification key identification data. The policy setting unit 34 writes the document file d10 composed of document content d11, access control policy d12 and security data d15 to the policy-setting storage device 31.

Next, in the policy setting apparatus 30, the policy setting unit 34 transmits document identification data and key data to the key-management server apparatus 20 via the secure communications unit 32, as the person in charge of setting document policies operates the policy setting apparatus 30.

In the key-management server apparatus 20, the key management unit 23 associates the document identification data and the key data with each other and writes them to the key-management data storage device 21 upon receiving the document identification data and the key data from the policy setting apparatus 30 via the secure communications unit 22.

Thereafter, in the policy setting apparatus 30, the document file d10 stored in the policy-setting storage device 31 is transmitted from the communications unit 33 to the file-access control apparatus 40 as the person in charge of setting document policies operates the policy setting apparatus 30.

In the file-access control apparatus 40, the communications unit 42 receives the document file d10 from the policy setting apparatus 30 and writes the document file d10 to the storage device 41.

Thus, the file-access control apparatus 40 is prepared to control an access to the document file d10.

(File Access Control)

In the file-access control apparatus 40, the user, i.e., document manipulator, manipulates the document file d10 through the document application unit 45.

At this point, the document application unit 45 inputs the event data associated with the action the user has performed and the document file d10 to the policy evaluation control module 44 (ST1).

In the policy evaluation control module 44, the event control unit 44a receives the event data and the document file d10 and determines whether the event data represents that "reading (opening) of document" (ST2).

In Step ST2, the event data may be found not to present the "reading of document" (that is, NO in ST2). In this case, the document file and the event data are supplied to the evaluation-data acquisition unit 44c, and the process goes to Step ST6.

If the decision made in Step ST2 is "reading of document" (if YES in ST2), the event control unit 44a determines, from the security data d15, whether the document content d11 and the access control policy d12 have been encrypted and also determines whether the security data d15 contains a digital signature.

If the document content d11 and the like are found encrypted or if the security data d15 is found to contain a digital signature, the event control unit 44a sends the document file d10 to the decryption/signature verification unit 44b, causing the unit 44b to decrypt the file and verify the signature (ST3).

On receiving the document file d10 from the event control unit 44a, the decryption/signature verification unit 44b determines whether the document content d11 and the access control policy d12 have been encrypted, from the security data d15 about the document file d10. At the same time, the decryption/signature verification unit 44b determines whether the security data d15 contains the digital signature.

If the document content d11 and the like are found encrypted and/or if the security data d15 is found to contain a digital signature, the decryption/signature verification unit 44b acquires the symmetric key and/or the verification key from the key-management server apparatus 20, based the key identification data contained in the security data d15. Further, the decryption/signature verification unit 44b decrypts the document content d11 with the symmetric key acquired, and/or uses the verification key, verifying the digital signature. Thereafter, the decryption/signature verification unit 44b sends the result of decryption and/or the result of verification to the event control unit 44a.

If the decryption/signature verification unit 44b performs processes successfully, the event control unit 44a sends the document file d10 containing the decrypted document content d11 and access control policy d12 to the evaluation-data acquisition unit 44c.

The evaluation-data acquisition unit 44c receives the document file d10 and the event data. Then, the unit 44c acquires, from an external apparatus, the evaluation data of the type described in a prescribed evaluation data list.

More specifically, the secure communications unit 43 transmits a request for the user authentication to the authentication server apparatus 10, so that the evaluation-data acquisition unit 44c may acquire the result of user authentication and the user attribute data. The result of user authentication (i.e., success or failure) and the user attribute data are thereby acquired from the authentication server apparatus 10.

The evaluation-data acquisition unit 44c acquires the time data from an external apparatus.

To acquire the executability data, the evaluation-data acquisition unit 44c sends a request for the executability data to the obligation executability data acquisition unit 44d. Therefore, the unit 44c acquires the executability data from the obligation executability data acquisition unit 44d (ST4).

Thus, the evaluation-data acquisition unit 44c acquires the evaluation data composed of the result of user authentication, the user attribute data, the time data, and the executability data about the external function (ST5). The evaluation-data acquisition unit 44c may be configured to acquire not only the evaluation data, but also the evaluation data described in the access control policy d12.

After acquiring the evaluation data, the evaluation-data acquisition unit 44c sends the access control policy d12 of the document file d10, the event data and the evaluation data to the inhibition-type policy evaluation unit 44e.

The inhibition-type policy evaluation unit 44e receives the event data and the evaluation data from the evaluation-data acquisition unit 44c. The unit 44e then evaluates the inhibition-type policy d13 described in the access control policy d12, on the basis of the event data and the evaluation data (ST6). After evaluating the policy d13, the unit 44e sends the event data, the evaluation data, the result of evaluating the inhibition-type policy d13 (i.e., success or failure), and the obligation-type policy d14 described in the access control policy d12, to the obligation-type policy evaluation unit.

The obligation-type policy evaluation unit 44f evaluates the obligation-type policy d14, on the basis of the event data, the evaluation data and the result of evaluating the inhibition-type policy d13 (ST7). After so evaluating the obligation-type policy d14, the unit 44f sends, to the control management unit 44g, the control data including the obligation fulfillment subject and the obligation fulfillment action.

On receiving the control data, the control management unit 44g sends the control data to the document-application control unit 44h, the document-file control unit 44i or the external service control unit 44j in a predetermined order, in accordance with the obligation fulfillment subject described in the control data (ST8).

The document-application control unit 44h controls the document application unit 45 in accordance with the obligation fulfillment action described in the control data sent from the control management unit 44g.

The document-file control unit 44i changes the access control policy d12 and the security data d15, both included in the document file d10 stored in the storage device 41, in accordance with the obligation fulfillment action described in the control data sent from the control management unit 44g.

The external service control unit 44j controls the external service unit 46 in accordance with the obligation fulfillment action described in the control data sent from the control management unit 44g.

The policy evaluation control module 44 determines whether the event control unit 44a has input new event data (ST9). If new event data has been input (if YES in ST9), the module 44 repeats Step ST2 et seq.

Figure 13:
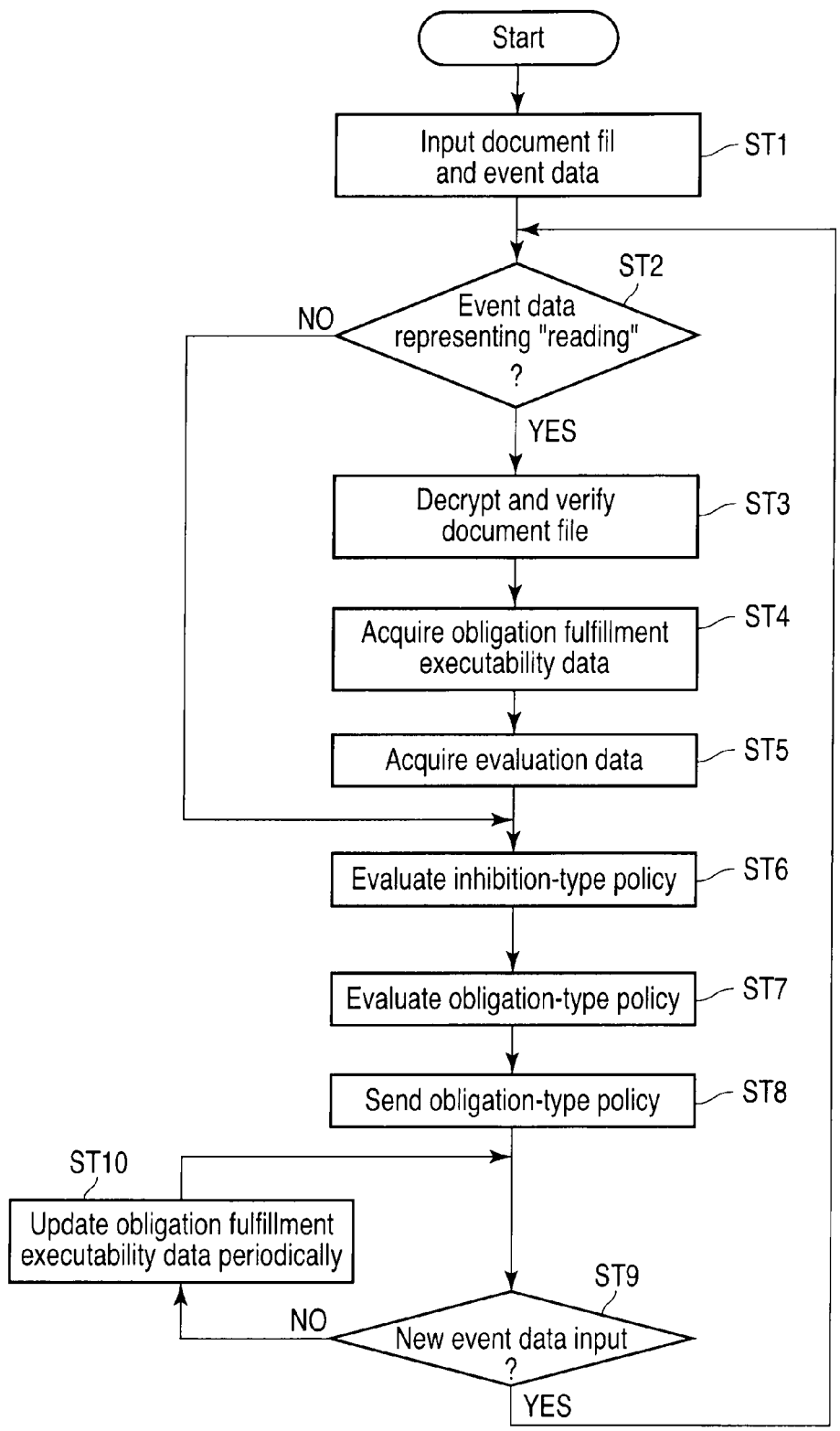
FIG. 13 is a flowchart explaining a modification of the operation sequence of the embodiment.

As shown in FIG. 13, the obligation executability data acquisition unit 44d may periodically update the executability data (ST10). The file-access control apparatus 40 can therefore work well even if the external service unit 46 changes in operating state.

In this embodiment, the policy evaluation control module 44 can change and perform the access control in accordance with the action made on the document file d10 as described above, and the processes in the document application unit 45 and external service unit 46 can be set and controlled.

To be more specific, the control data in accordance with the action made is imparted as obligation-type policy d14 to the document file d10 beforehand. The obligation-type policy d14 thus included in the document file d10 is evaluated and executed in accordance with the action to the document file d10. The execution of the obligation-type policy d14 includes the control of the document application unit 45 etc. Hence, an active control can be achieved and the document access control can be changed, in accordance with the manipulation of the document.

The method exhibited in each above-mentioned embodiment can be distributed as a computer executable program by storing into a storage medium such as a magnetic disk (floppy™ disk, hard disk, etc.), an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

As has been described, the present invention can perform an active control in accordance with any manipulation made to a document, and can change the document access control.

What is claimed is:

1. A file-access control apparatus designed to control accesses to a document file, comprising:
   a storage device capable of storing document contents, each including an inhibition-type policy and an obligation-type policy;
   an evaluation controller;
   a document application controller;
   a decryption/signature verification controller;
   an event controller;
   an authentication server; and
   an external service controller;
   wherein the decryption/signature verification controller determines whether a document content and access control policy has been encrypted or contains a digital signature, the decryption/signature verification controller decrypts the document content using key data if the content is encrypted or verify the digital signature using a verification key if it contains the digital signature;
   wherein the event controller send the event data and the document file to the evaluation-data acquisition device, after determining legitimacy of the document content;
   wherein the evaluation controller includes:
   an evaluation data acquisition device configured to acquire document content and executability data items from the event controller, the document application controller and the external service controller, respectively, and to hold the executability data items, the executability data items being status executability data of the document application controller and the external service controller, the evaluation data acquisition device further send a user authentication request to the authentication server to authenticate an end-user;
   an authentication-result acquisition device configured to acquire a result of authentication of the user and user attribute data, on the basis of a prescribed evaluation data list, upon receiving, from the document application controller, event data representing an action made by the user and a document file stored in the storage device;
   a sending device configured to send evaluation data composed of the executability data, the result of authentication and user attribute data, the event data, the inhibition-type policy, and the obligation-type policy on the basis of a prescribed evaluation data list, upon receiving the executability data from the executability data acquisition means;
   a comparing device configured to compare the authentication result, user attribute data and event data, all included in the evaluation data sent, respectively with the authentication result, user attribute data and event data, all prescribed in the inhibition-type policy, and for sending evaluation result showing the permission or inhibition prescribed in the inhibition-type policy, when the items included in the evaluation data are identical to the items included in the inhibition-type policy;
   an obligation-type policy evaluation control device for comparing the executability data, event data and evaluation result, all included in the valuation data, with the executability data, event data and evaluation result, all included in the obligation-type policy, and for sending control data including an obligation fulfillment subject and an obligation fulfillment action prescribed in the obligation-type policy, when the items included in the evaluation data are identical to the items included in the obligation-type policy;
   a control management device for sending the control data to a subject represented by the obligation fulfillment subject upon receiving the control data, on the basis of the obligation fulfillment subject included in the control data; and
   a document-application control device for controlling the document application controller, on the basis of the obligation fulfillment action included in the control data sent from the control management device when the represented subject is the document-application control device, and
   wherein the executability data indicates whether the document application controller and the external service controller can be controlled or cannot be controlled in accordance with whether the document application controller operates and the external service trait controller is in service.

2. The file-access control apparatus according to claim 1, wherein the policy evaluation control device further includes a policy changing device for changing the inhibition-type policy or the obligation-type policy, stored in the storage device, on the basis of the obligation fulfillment action included in the control data sent from the control management device when the represented subject is the policy changing device.

3. The file-access control apparatus according to claim 2, wherein the policy evaluation control device further includes an external service control device for controlling the external service controller on the basis of the obligation fulfillment action included in the control data sent from the control management device when the represented subject is the external service control device.

4. The file-access control apparatus according to claim 1, wherein the policy evaluation control device further includes an external service control device for controlling the external service controller on the basis of the obligation fulfillment action included in the control data sent from the control management device.

5. A file-access control apparatus designed to control accesses to a document file, comprising:
   a storage device capable of storing document contents, each including an inhibition-type policy and an obligation-type policy;
   an evaluation controller;
   a document application controller;
   a decryption/signature verification controller;
   an event controller;
   an authentication server; and
   an external service controller,
   wherein the decryption/signature verification controller determines whether a document content and access control policy has been encrypted or contains a digital signature, the decryption/signature verification controller decrypts the document content using key data if the content is encrypted or verify the digital signature using a verification key if it contains the digital signature;
   wherein the event controller send the event data and the document file to the evaluation- data acquisition device, after determining legitimacy of the document content;
   wherein the evaluation controller includes:
   an evaluation data acquisition device configured to acquire document content and executability data items from the event controller, the document application controller and the external service controller, respectively, and to hold the executability data items, the executability data items being executability data of the document application controller and the external service controller, the evaluation data acquisition device further send a user authentication request to the authentication server to authenticate an end-user;

an authentication-result acquisition device configured to acquire a result of authentication of the user and user attribute data, on the basis of a prescribed evaluation data list, upon receiving, from the document application controller, event data representing an action made by the user and a document file stored in the storage device;

a sending device configured to send evaluation data composed of the executability data, the result of authentication and user attribute data, the event data, the inhibition-type policy, and the obligation-type policy on the basis of a prescribed evaluation data list, upon receiving the executability data from the executability data acquisition device;

a comparing device configured to compare the authentication result, user attribute data and event data, all included in the evaluation data sent, respectively with the authentication result, user attribute data and event data, all prescribed in the inhibition-type policy, and to send evaluation result showing the permission or inhibition prescribed in the inhibition-type policy, when the items included in the evaluation data are identical to the items included in the inhibition-type policy;

an obligation-type policy evaluation control device configured to compare the executability data, event data and evaluation result, all included in the valuation data, with the executability data, event data and evaluation result, all included in the obligation-type policy, and to send control data including an obligation fulfillment subject and an obligation fulfillment action prescribed in the obligation-type policy, when the items included in the evaluation data are identical to the items included in the obligation-type policy;

a control management device configured to send the control data to a subject represented by the obligation fulfillment subject upon receiving the control data, on the basis of the obligation fulfillment subject included in the control data; and a document-application control device configured to control the document application controller, on the basis of the obligation fulfillment action included in the control data sent from the control management device when the represented subject is the document-application control device, and wherein the executability data indicates whether the document application controller and the external service controller can be controlled or cannot be controlled in accordance with whether the document application controller operates and the external service controller is in service.

6. The file-access control apparatus according to claim 5, wherein the policy evaluation control device further includes a policy changing device configured to change the inhibition-type policy or the obligation-type policy, either stored in the storage device, on the basis of the obligation fulfillment action included in the control data sent from the control management device when the represented subject is the policy changing device.

7. The file-access control apparatus according to claim 6, wherein the policy evaluation control device further includes an external service control device configured to control the external service controller on the basis of the obligation fulfillment action included in the control data sent from the control management device when the represented subject is the external service control device.

8. The file-access control apparatus according to claim 5, wherein the policy evaluation control device further includes an external service control device configured to control the external service controller on the basis of the obligation fulfillment action included in the control data sent from the control management device.

9. A non-transitory computer-readable medium storing computer readable instructions thereon which when executed by a file-access control apparatus, having a storage device that stores a document file including a document content, an inhibition-type policy, an obligation-type policy, a document application controller, a decryption/signature verification controller, an event controller, an authentication server, and an external service controller and which is configured to control access to the document file, cause the file-access control apparatus to perform a method comprising:

the decryption/signature verification controller determines whether a document content and access control policy has been encrypted or contains a digital signature, the decryption/signature verification controller decrypts the document content using key data if the content is encrypted or verify the digital signature using a verification key if it contains the digital signature;

the event controller send the event data and the document file to an evaluation-data acquisition device, after determining legitimacy of the document content;

acquiring document content and executability data items from the event controller, the document application controller and the external service controller, respectively, and holding the executability data items, the executability data items being executability data of the document application controller and the external service controller, the evaluation data acquisition device further send a user authentication request to the authentication server to authenticate an end-user;

acquiring result of authentication of the user and user attribute data, on the basis of a prescribed evaluation data list, upon receiving, from the document application controller, event data representing an action made by the user and a prescribed document file;

sending evaluation data composed of the executability data, result of authentication and user attribute data, the event data, the inhibition-type policy, and the obligation-type policy on the basis of a prescribed evaluation data list, upon receiving the executability data from an executability data acquisition controller;

comparing the authentication result, user attribute data and event data, all included in the evaluation data sent, respectively with the authentication result, user attribute data and event data, all prescribed in the inhibition-type policy, and sending evaluation result showing the permission or inhibition prescribed in the inhibition-type policy, when the items included in the evaluation data are identical to the items included in the inhibition-type policy;

comparing the executability data, event data and evaluation result, all included in the valuation data, with the executability data, event data and evaluation result, all included in the obligation-type policy, and sending control data including an obligation fulfillment subject and an obligation fulfillment action prescribed in the obligation-type policy, when the items included in the evaluation data are identical to the items included in the obligation-type policy;

sending the control data to a subject represented by the obligation fulfillment subject upon receiving the control data, on the basis of the obligation fulfillment subject included in the control data; and controlling the document application controller, on the basis of the obligation fulfillment action included in the control data sent when the represented subject is the document-application controlling, wherein the executability data indicates whether the document application controller and the external service controller can be controlled or cannot be controlled in accordance with whether the document application controller operates and the external service controller is in service.

10. The file-access control apparatus according to claim 2, wherein the obligation fulfillment subject identifies either the document application controller or the external service controller, and the executability data items indicate whether the document-application control device or the external service control device can control the obligation fulfillment subject.

\* \* \* \* \*